United States Patent

[11] 3,626,283

| [72] | Inventors | Robert L. James<br>Bloomfield;<br>Frank Antonazzi, New Milford, both of N.J. |
|---|---|---|
| [21] | Appl. No. | 884,111 |
| [22] | Filed | Dec. 11, 1969 |
| [45] | Patented | Dec. 7, 1971 |
| [73] | Assignee | The Bendix Corporation |

[54] APPARATUS FOR MONITORING AND INDICATING AN OPERATIONAL FAILURE OF A LINEAR VOLTAGE DIFFERENTIAL TRANSFORMER
2 Claims, 2 Drawing Figs.

[52] U.S. Cl.................................................. 324/55,
318/657, 324/99, 324/133, 340/199
[51] Int. Cl........................................................ G01r 31/02,
G01r 31/06
[50] Field of Search.......................................... 324/55, 99,
133; 340/199; 318/657

[56] References Cited
UNITED STATES PATENTS

| 3,079,545 | 2/1963 | Kretsch et al................ | 340/199 UX |
| 3,100,889 | 8/1963 | Cannon........................ | 340/199 X |
| 3,185,973 | 5/1965 | Garber......................... | 340/199 |
| 3,374,665 | 3/1968 | Preston........................ | 318/657 X |

*Primary Examiner*—Gerard R. Strecker
*Attorneys*—Ronald G. Gillespie and Plante, Arens, Hartz, Smith and Thompson

ABSTRACT: A device for monitoring and indicating an operational failure of a linear voltage differential transformer and including summing means which sums the secondary voltages from the transformer. The sum signal is converted to a direct current voltage which is applied to an operational amplifier where it is balanced with a reference direct current voltage of equal amplitude and opposite polarity. An alternating current signal is also applied to the amplifier causing the amplifier to provide an alternating current output. Failure of the transformer or any part of the monitor causes the direct current voltages to become unbalanced resulting in the amplifier providing a direct current output. An indicator connected to the amplifier provides an indication of failure in response to a direct current output and not in response to an alternating current output from the amplifier.

PATENTED DEC 7 1971 3,626,283

INVENTORS:
ROBERT L. JAMES
FRANK ANTONAZZI

BY *Ronald G. Gillespie*
ATTORNEY

APPARATUS FOR MONITORING AND INDICATING AN OPERATIONAL FAILURE OF A LINEAR VOLTAGE DIFFERENTIAL TRANSFORMER

BACKGROUND OF THE INVENTION

1. Field of the Invention

The present invention relates to monitors and, more particularly, to a self-checking monitor.

2. Description of the Prior Art.

Heretofore, a linear voltage differential transformer was not monitored during operation since the outputs of the transformer are variables dependent on the transformer armature displacement. Thus a monitor would have difficulty in distinguishing between normal variations of the outputs from the transformer and variations of the outputs due to failures of the transformer windings. The present invention effectively monitors a linear voltage differential transformer by summing the outputs from the transformer. The sum of the outputs from the transformer is normally a constant and any variation in the sum indicates a winding failure in the transformer.

SUMMARY OF THE INVENTION

A device for monitoring a linear voltage differential transformer providing a plurality of alternating current outputs, comprising means connected to the transformer for providing a direct current voltage corresponding to the sum of the alternating current outputs from the transformer. Reference voltage means provides a reference direct current voltage of equal amplitude and opposite polarity to the first mentioned direct current voltage so as to initially balance the first mentioned voltage. Indicating means receiving the direct current voltages and provides no indication while the direct current voltages remain balanced and provides an indication when the direct current voltages are not balanced.

One object of the present invention is to monitor a linear voltage differential transformer while it is operating and to provide an indication when the transformer has failed.

Another object of the present invention is to sum the outputs of a linear voltage differential transformer so that a failure of the transformer results in the sum changing.

Another object of the present invention is to balance a direct current voltage corresponding to the sum of the outputs from a linear voltage differential transformer with an opposite polarity direct current reference voltage so that a failure of the transformer results in the direct current voltages being unbalanced and to provide an indication when the voltages are unbalanced.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
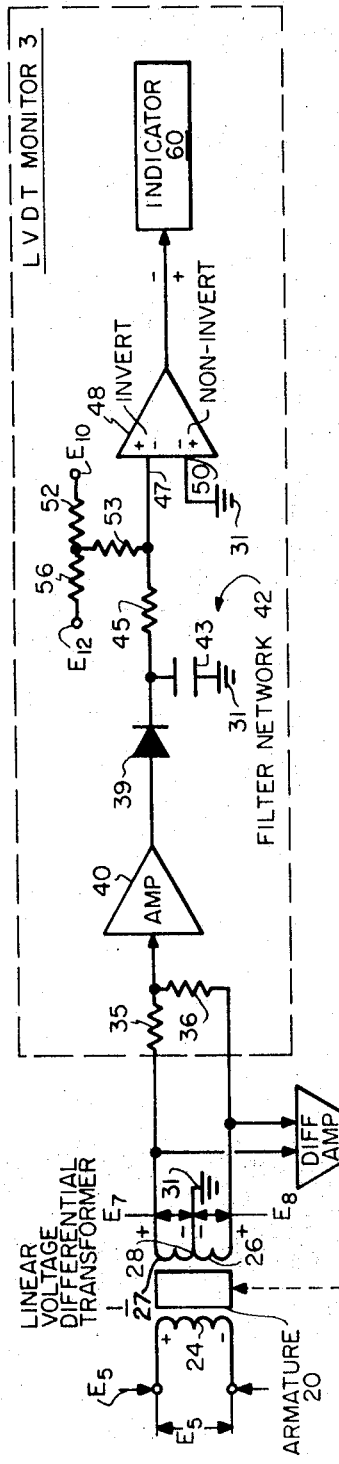
FIG. 1 shows a control system having a linear voltage differential transformer which is monitored by a monitor constructed in accordance with the present invention.

Referring to FIG. 1, there is shown a control system having a conventional-type linear voltage differential transformer 1 and a monitor 3, constructed in accordance with the present invention, for providing an indication when transformer 1 has failed. The control system, by way of example, may be a system for positioning a movable surface 4 of an aircraft such as the aircraft's elevators and also includes control means 5, which may be similar to a type disclosed in U.S. application Ser. No. 764,245 filed by Tawfik et al. on Oct. 1, 1968 and assigned to The Bendix Corporation, assignee of the present invention.

Control means 5 provides a command signal $E_1$ to summing means 8 which sums signal $E_1$ with a followup signal $E_2$ to provide an error signal $E_3$ to a conventional-type electronically controlled hydraulic actuator 12. Actuator 12 is mechanically connected to movable surface 4 and positions surface 4 in accordance with error signal $E_3$.

The circuit for providing followup signal $E_2$ includes transformer 1, a conventional-type difference amplifier 14, and an amplifier 18. Transformer 1 has a movable armature 20, which is positioned by actuator 12 to correspond to the position of movable surface 4, a primary winding 24 receiving a sinusoidal excitation voltage $E_5$, and secondary winding 26 having a common connection 28 to ground 31 and providing secondary voltages $E_7$, $E_8$ having the phase relationship to voltage $E_5$ indicated in FIG. 1. A change in position of armature 20 of transformer 1 affects the flux linking primary winding 24 to secondary windings 26, 27 so as to change voltages $E_7$, $E_8$. Transformer 1 provides voltages $E_7$, $E_8$ to difference amplifier 14 which provides followup signal $E_2$, corresponding to the difference between voltages $E_7$, $E_8$, to summing means 8 through amplifier 18.

Monitor 3 is able to effectively monitor transformer 1 because the sum of voltages $E_7$, $E_8$ is a constant and a failure of transformer 1 will change the sum of the voltages $E_7$, $E_8$ to a value other than the constant value. Voltages $E_7$, $E_8$ are summed by summing resistors 35, 36, connected in series across secondary winding 26 of transformer 1, and the sum signal is applied to a rectifying diode 39 through an amplifier 40. A filter network 42 filters a half-wave rectified signal from diode 39 to provide a positive direct current voltage. Filter network 42 includes a capacitor 43 connecting diode 39 to ground 31 and a resistor 45 connecting diode 39 to an inverting input 47 of an operational amplifier 48 having a noninverting input 50 connected to ground 31.

A negative direct current reference voltage $E_{10}$ is applied to input 47 of amplifier 48 through series connected resistors 52, 53 having selected resistance values so that the negative direct current voltage $E_{10}$ is equal in amplitude to the positive direct current voltage from filter network 42. A square wave signal $E_{12}$, that is preferably 180° out of phase with voltages $E_7$ and $E_8$, is applied through series connected resistors 53, 56 to input 47 of amplifier 48. Resistor 56 has a suitable resistance value to prevent a common connection between resistors 52, 53, 56 from becoming a ground for the direct current voltage $E_{10}$.

Since the direct current voltages effectively cancel each other, signal $E_{12}$ causes amplifier 48 to provide a square wave signal to indicator 60. Indicator 60 may be of a conventional type that is responsive to a direct current voltage but not to an alternating current voltage. During normal operation, indicator 60 provides no indication since the signal from amplifier 48 is an alternating current signal.

When transformer 1 fails, the sum of voltages $E_7$, $E_8$ changes the amplitude of the direct current voltage from filter network 42 so that the direct current voltages applied to input 47 of amplifier 48 are no longer balanced. Under this special condition, amplifier 48 provides a negative or positive direct current voltage depending on whether the amplitude of the direct current voltage from filter network 42 exceeds or is less than the amplitude of the negative direct current voltage. The direct current voltage from amplifier 48 causes indicating means 60 to provide an indication.

The failure of an element in monitor 3 results in amplifier 48 providing a direct current voltage causing indicating means 60 to provide an indication thus giving monitor 3 a self-checking capability. When either resistors 35, 36, amplifier 40, diode 39, resistor 45, or capacitor 43 fails, the direct current voltage from filter network 42 changes unbalancing the direct current voltages and causing amplifier 48 to provide a direct current voltage to indicator 60. When resistor 52 or resistor 53 fails, the direct current reference voltage applied to input 47 of amplifier 48 changes causing amplifier 48 to provide a direct current voltage to indicator 60. When resistor 56 fails, either signal $E_{12}$ is not applied to amplifier 48 or the direct current reference voltage applied to amplifier 48 changes; both conditions cause amplifier 48 to provide a direct current voltage to indicating means 60.

Figure 2:
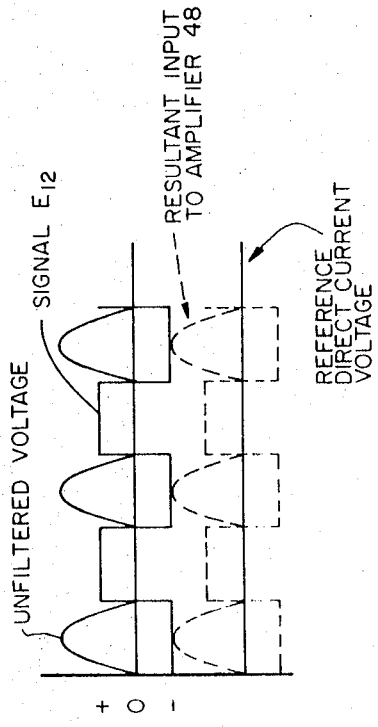
FIG. 2 shows the waveforms of the voltages applied to the operational amplifier shown in FIG. 1 when the capacitor shown in FIG. 1 fails in an open mode.

When the mode of failure of capacitor 43 is such that capacitor 43 is open, filter network 42 provides a rectified signal, such as shown in FIG. 2, to amplifier 48. However, since signal $E_{12}$ is 180° out of phase with voltages $E_7$, $E_8$; signal $E_{12}$ does not add to the unfiltered voltage from network 42 so that the resultant input to amplifier 48 is negative, as shown in FIG. 2, due to the effect of the reference voltage $E_{10}$. Amplifier 48 provides a positive direct current voltage to indicator 60 in response to the resultant negative input applied to amplifier 48.

Referring to FIG. 1, diode 39 may be connected in a reverse manner to that shown in FIG. 1. Filter network 42 would then provide a negative direct current voltage which requires that reference voltage $E_{10}$ be a positive direct current voltage.

The device of the present invention, as heretofore described, monitors a linear voltage differential transformer while the transformer is operating and provides an indication when the transformer has failed. The output voltages of the transformer are summed and a reference voltage equal to that sum is provided, so that failure of the transformer causes the sum of the outputs from the transformer to have a value that is different than the value of the reference voltage.

What is claimed is:

1. A device for monitoring a linear voltage differential transformer providing a plurality of alternating current outputs, comprising means connected to the transformer for providing a direct current voltage corresponding to the sum of the alternating current outputs from the transformer, means for providing a reference direct current voltage of equal amplitude and opposite polarity to the first mentioned direct current voltage to initially balance the first mentioned direct current voltage, and indicating means connected to the direct current voltage means and to the reference voltage means for providing no indication when the direct current voltages are balanced and providing an indication when the direct current voltages are not balanced, the indicating means including means for providing an alternating current signal, an operational amplifier connected to the sum voltage means, to the reference voltage means and to the alternating current signal means and providing an alternating current output in response to the alternating current signal when the direct current voltages are balanced and a direct current output when the direct current voltages are not balanced, and an indicator connected to the operational amplifier and providing an indication in response to a direct current output from the operational amplifier and providing no indication in response to an alternating current output from the operational amplifier.

2. A control system comprising a controlled device; means for providing a command signal; means connected to the controlled device for providing a followup signal and including a linear voltage differential transformer providing a plurality of alternating current outputs and first difference means connected to the transformer for providing the followup signal corresponding to the difference between the outputs from the transformer, second difference means connected to the controlled device, to the command signal means and to the followup signal means for providing a control signal to the controlled device corresponding to the difference between the command signal and the followup signal; and monitoring means including means connected to the transformer for providing a direct current voltage corresponding to the sum of the alternating current outputs from the transformer, means for providing a reference direct current voltage of equal amplitude and opposite polarity to the first-mentioned direct current voltage to initially balance the first-mentioned direct current voltage, and indicating means connected to the direct current voltage means and to the reference voltage means for providing no indication when the direct current voltages are balanced and providing an indication when the direct current voltages are not balanced, the indicating means including means for providing an alternating current signal, an operational amplifier connected to the sum voltage means, to the reference voltage means and to the alternating current signal means and providing an alternating current output in response to the alternating current signal when the direct current voltages are balanced and a direct current output when the direct current voltages are not balanced, and an indicator connected to the operational amplifier and providing an indication in response to a direct current output from the operational amplifier and providing no indication in response to an alternating current output from the operational amplifier.

* * * * *